United States Patent [19]
Wakui

[11] Patent Number: 5,563,396
[45] Date of Patent: Oct. 8, 1996

[54] DATA COMMUNICATING DEVICE

[75] Inventor: Yoshio Wakui, Tokyo, Japan

[73] Assignee: Asahi Kogaku Kogyo Kabushiki Kaisha, Tokyo, Japan

[21] Appl. No.: 291,910

[22] Filed: Aug. 18, 1994

[30]     Foreign Application Priority Data

Aug. 20, 1993  [JP]  Japan .................................. 5-228143

[51] Int. Cl.⁶ ............................. G06K 7/10; G06K 7/06
[52] U.S. Cl. .......................................... 235/441; 235/486
[58] Field of Search ................................. 239/487, 441, 239/380, 492, 486, 375; 358/335; 361/754

[56]                References Cited

U.S. PATENT DOCUMENTS

| | | | |
|---|---|---|---|
| 4,742,215 | 5/1988 | Daughters et al. ...................... | 235/487 |
| 4,767,918 | 8/1988 | Kushima et al. ..................... | 235/492 X |
| 5,179,478 | 1/1993 | Aoki ............................... | 360/35.1 |
| 5,179,505 | 1/1993 | Matsuo ................................ | 235/495 X |
| 5,196,687 | 3/1993 | Sugino et al. ........................... | 235/441 |
| 5,239,382 | 8/1993 | Hatakenaka et al. .................... | 358/335 |
| 5,330,363 | 7/1994 | Gardner et al. ......................... | 438/188 |
| 5,369,259 | 11/1994 | Bleier et al. ............................ | 235/441 |

FOREIGN PATENT DOCUMENTS

| | | | |
|---|---|---|---|
| 0213041 | 3/1987 | European Pat. Off. ............... | 235/486 |
| 0254316 | 1/1988 | European Pat. Off. ............... | 235/486 |
| 2607290 | 5/1988 | France ................................... | 235/486 |
| 0255082 | 10/1989 | Japan .................................... | 235/486 |

Primary Examiner—Donald T. Hajec
Assistant Examiner—Thien Minh Le
Attorney, Agent, or Firm—Greenblum & Bernstein P.L.C.

[57]            ABSTRACT

A data communicating device which exchanges data with an IC memory card, has a mechanism for ejecting the IC memory card into and out of the data communicating device. The data communicating device also has a controller for controlling an operation of the ejecting mechanism, and a detector for detecting whether data is being exchanged between the IC memory card and the data communicating device. The control inhibits the ejecting mechanism form ejecting the IC memory card while data is being exchanged.

12 Claims, 6 Drawing Sheets

DATA COMMUNICATING DEVICE

BACKGROUND OF THE INVENTION

The present invention relates to a communicating device which can store and retrieve data from a recording medium.

Recently, cameras using an IC memory card to store pictures has been proposed. In this camera, terminals of the IC memory card are connected with connectors of a loading unit of the camera. Data can then be exchanged between the IC memory card and the camera.

Conventionally, the IC memory card is manually inserted into the camera. Then, data is exchanged between the IC memory card and the camera. When the IC memory card is to be ejected from the camera, a mechanical interlock switch is pressed, and the IC memory card is mechanically ejected from the camera.

However, if the IC memory card is ejected while data is being exchanged between the IC memory card and the camera, the data exchange will be interrupted- If control data from the IC memory card was being transmitted to the camera, then the operation of the camera would be compromised. If picture data was being transmitted from the camera to the IC memory card, then the data would be corrupted, rendering the data useless. The operator would then have to take the picture again.

SUMMARY OF THE INVENTION

It is, therefore, an object of the invention to provide an improved data communicating device in which the corruption of data is prevented when the IC memory card is ejected.

According to one aspect of the present invention, there is provided a data communicating device which exchanges data with an IC memory card, in which the device includes:

a mechanism for ejecting the IC memory card out of the data communicating device;

a detector for detecting whether data is being exchanged between the IC memory card and the data communicating device; and a controller for inhibiting the mechanism from ejecting the IC memory card if detector detects that the data is being exchanged.

According to another aspect of the present invention, there is provided a method for loading an IC memory card into and ejecting the IC memory card out of a data communicating device; the method includes the steps of:

monitoring data transfer between the IC memory card and the data communicating device; and inhibiting the IC card from being ejected out of the data communicating device if data is being transferred.

DESCRIPTION OF THE EMBODIMENTS

Figure 1:
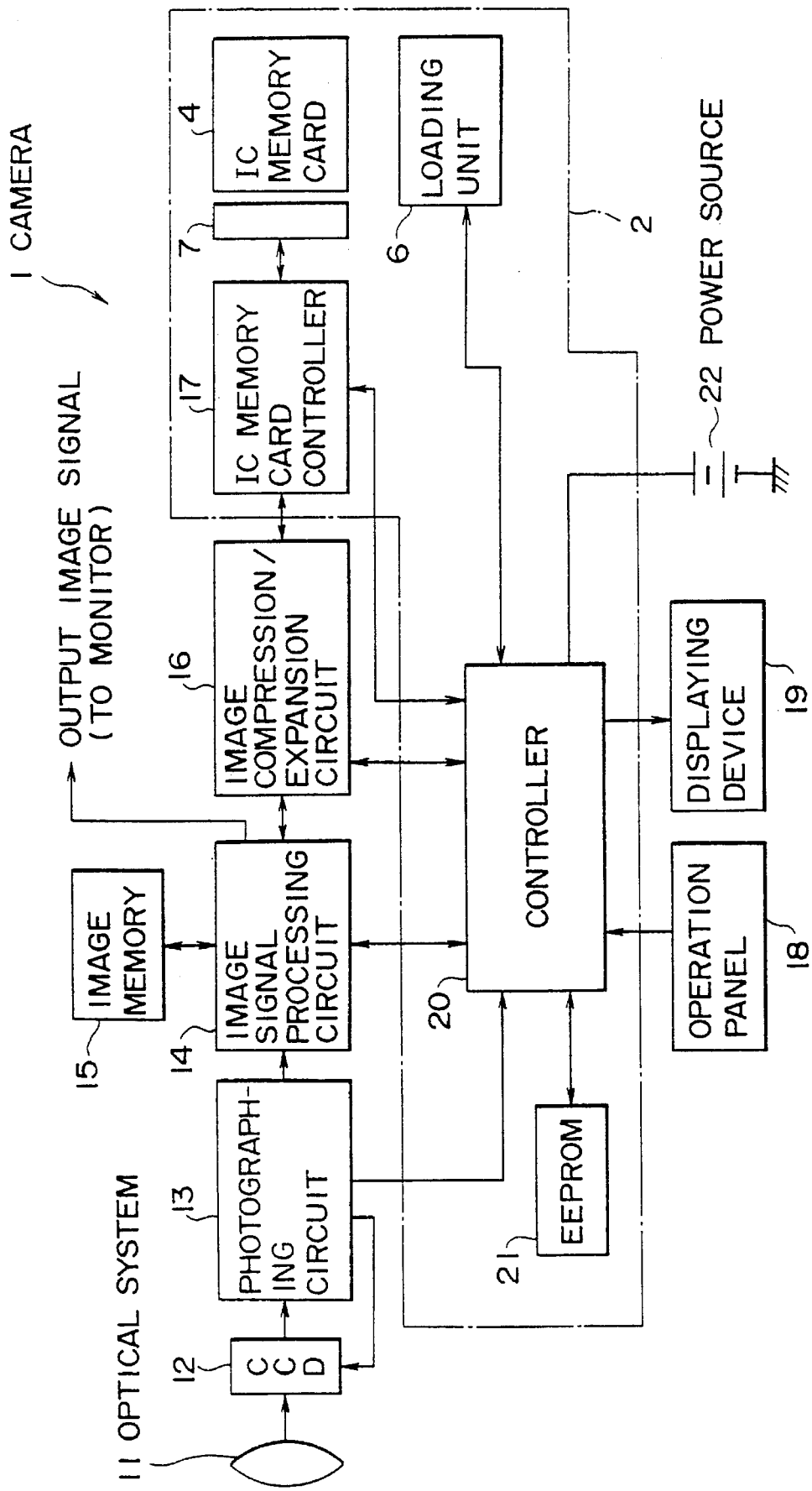
FIG. 1 shows a block diagram of a still video camera embodying the present invention.

FIG. 1 shows a block diagram of a still video camera embodying the present invention. A still video camera 1 (hereinafter referred to as camera 1) is capable of photographing and recording a picture, in the form of a video signal, onto an IC memory card. The camera 1 has a photographing optical system 11, a CCD (Charge Coupled Device) 12, a photographing circuit 13, a image signal processing circuit 14, an image memory 15, an image compression/expansion circuit 16, an operation panel 18, a displaying device 19, and a power source 22. The camera 1 further includes a data communicating device 2 which includes an IC memory card controller 17, a controller 20, a non-volatile read only memory (e.g. an EEPROM) 21, a loading unit 6 for loading an IC memory card 4, and a connector 7 to be connected with terminals 43 and 45 of the IC memory card 4 (shown in FIG. 5).

The controller 20 is a microcomputer which controls various functions of the data communicating device 2 as well as those of the camera 1.

The operation panel 18 is provided with various operation switches for actuating functions of the camera 1. The operation panel is provided with a main power switch for turning on and off power to the camera 1 and an eject switch for ejecting the loaded IC memory card out of the camera 1.

The operation panel also includes a recording mode selection switch for selecting a field recording mode or a frame recording mode; an operation mode switch for selecting a recording mode or a reproducing mode; a release switch for initiating a photographing operation; an address setting switch for addressing an area in the IC memory card where the video signal is recorded; a reproducing switch for initiating reproduction of a video signal stored in the IC memory card; and an overwrite switch for overwriting data stored in the IC memory card.

The display unit 19 has an LCD panel for displaying data. Some of the displayed data includes an ON/OFF condition of the camera; a operation mode that is selected; current time and date; and a condition of a strobe (not shown) that is used with the camera 1. The LCD panel also displays whether the IC memory card is loaded, and if loaded, an area on the IC memory card where the data is to be stored, or retrieved.

In this embodiment, the non-volatile memory 21 is an EEPROM (Electrically Erasable Programmable Read Only Memory). The non-volatile memory 21 is used for storing the photographing mode which is set by user, as well as information about the attribute and residual capacity of the IC memory card, and specific data required for controlling the controller.

The IC memory card 4 has an IC memory for storing data, related to picture information, in the form of a video signal. In the IC memory, IC memory card attribution information, such as memory type (static RAM or flash memory etc.), memory capacity, memory access speed, is stored. The information can be modified by using the operation panel 18 under the control of the controller 20, and the IC memory card controller 17.

The data communication device 2 is provided with a detecting unit 5 (FIG. 5) which detects whether the IC memory card 4 is electrically connected to the data communicating device 2.

Figure 2:
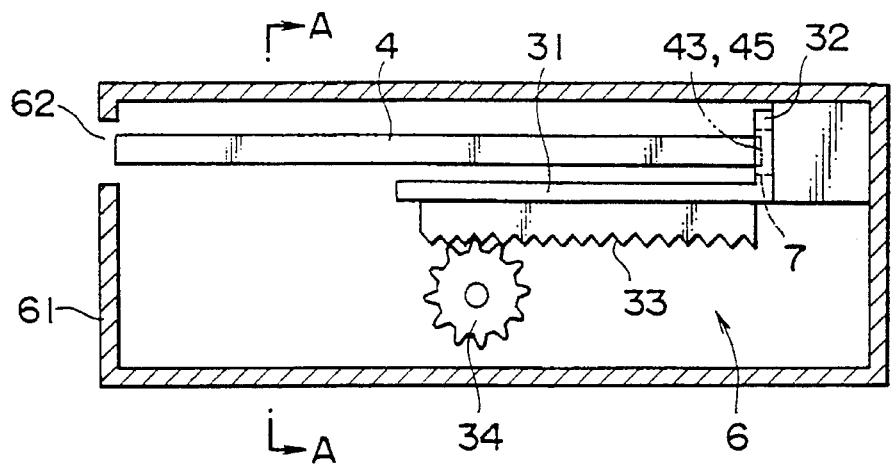
FIG. 2 shows a side view of a loading unit of the still video camera, when an IC memory card is completely inserted into the still video camera.
Figure 3:
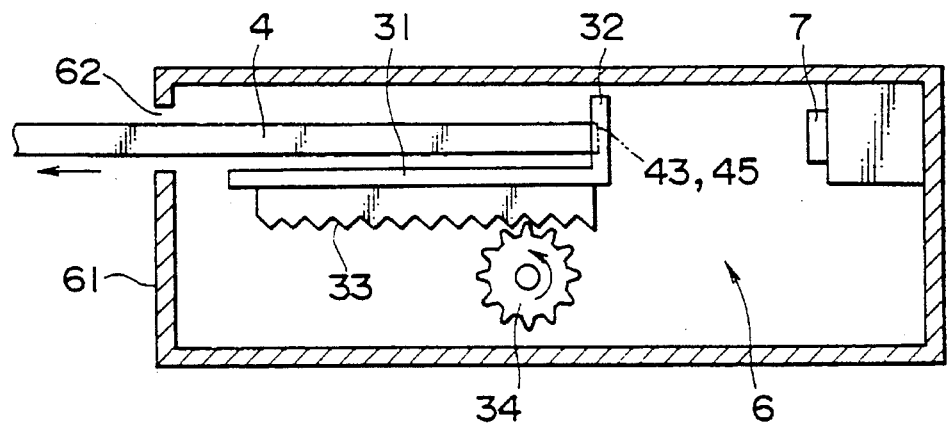
FIG. 3 shows a side view of the loading unit of the still video camera, when an IC memory card is partially ejected from the still video camera.
Figure 4:
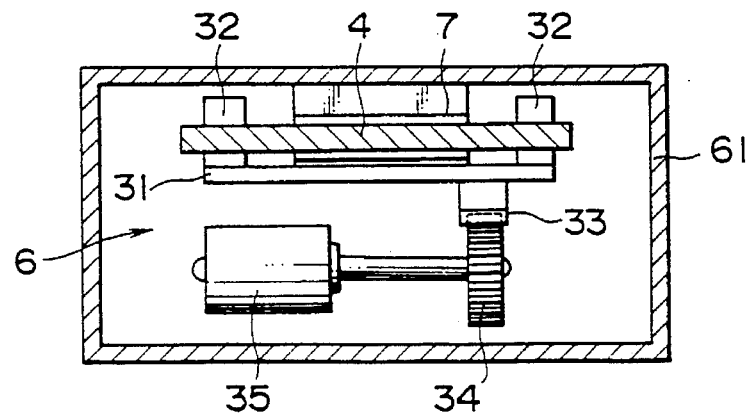
FIG. 4 shows a sectional view along line A—A of the loading unit shown in FIG. 2.

FIGS. 2 and 3 show schematic side views of the loading unit 6 and the IC memory card 4. In FIG. 2, the IC memory card 4 is fully inserted into the loading unit 6. In FIG. 3, the IC memory card 4 is partially ejected out of the loading unit 6. FIG. 4 is a sectional view (along A—A shown in FIG. 2) of the loading unit 6 and the IC memory card 4.

The loading unit 6 has a casing 61. An opening 62 is formed on a front surface (the left-hand side as shown in FIGS. 2 and 3) through which the IC memory card 4 is inserted. In the casing, the connector 7 is arranged so that the terminals 43 and 45 of the fully inserted (loaded) IC memory card 4 are coupled with the connector 7. The IC memory card 4 has 68 terminals which are electrically connected to the controller 17 through the connector 7. Terminals 43 and 45, shown in FIG. 5, represent two of the 68 terminals.

A carrier 31 is provided in the loading unit 6 for holding the IC memory card 4. A projection 32 of the carrier 31 engages each side of the IC memory card 4 (as shown in FIG. 4), when the IC memory card 4 is fully inserted. The carrier 31 has a rack 33 attached thereto, the rack 33 engaging a pinion gear 34. This allows the carrier 31 to move along a horizontal axis as shown in FIGS. 2 and 3. The pinion gear 34 is secured to a rotary shaft of a stepping motor 35.

Figure 5:
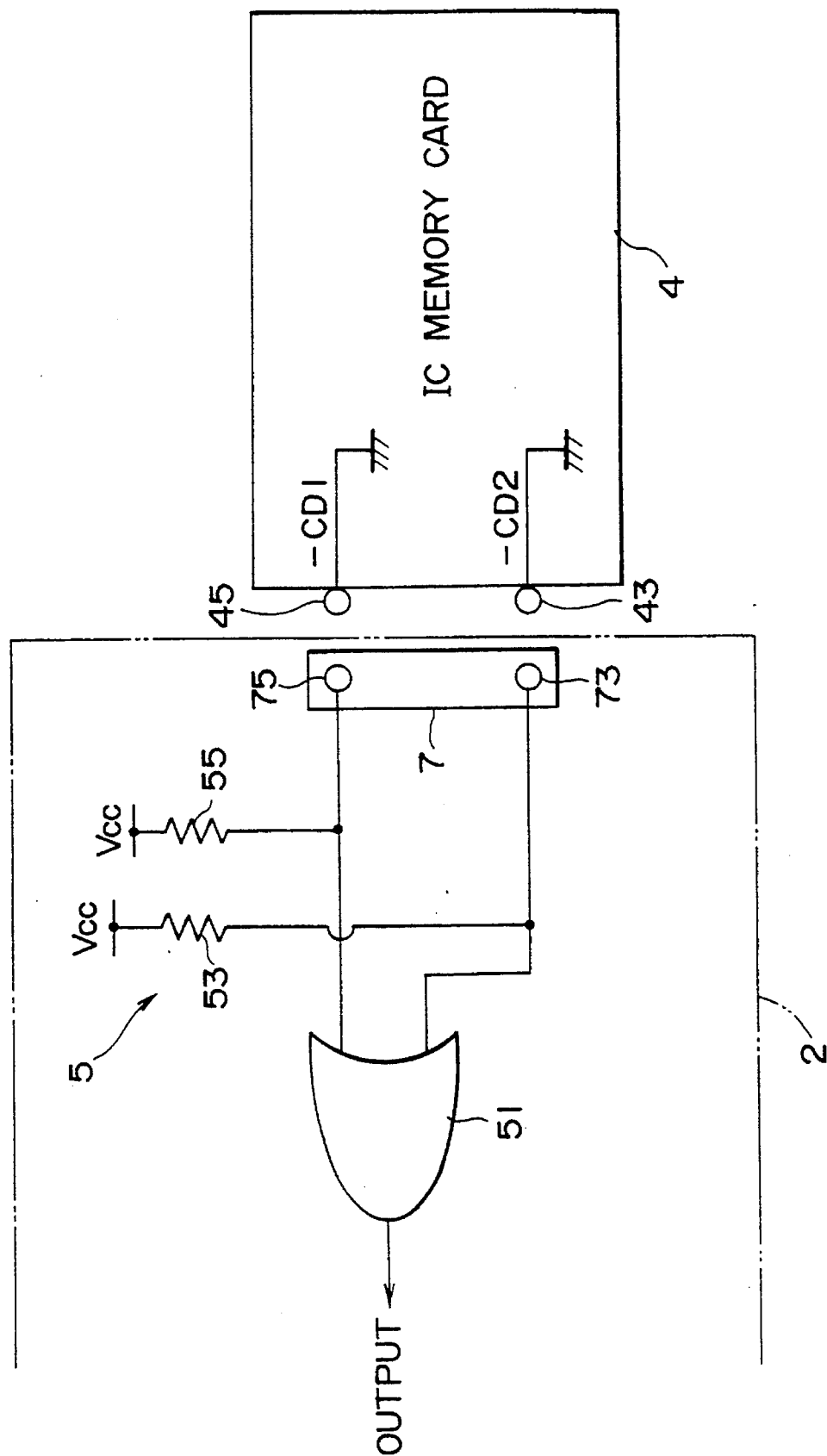
FIG. 5 shows a circuit of a connection detecting unit used in the loading unit to detect the IC memory card.

FIG. 5 shows a circuit illustrating the connection detecting unit 5. The detecting unit 5 has a circuit which conforms to the JEIDA (Japan Electric Industries Development Association) ver. 4.1 standard. The circuit has pull up resistors 53 and 55 respectively connected to a pair of terminals 73 and 75, and an OR gate 51. Voltage Vcc is applied to the pull-up resistors 53 and 55. The terminals 43 and 45 of the IC memory card 4 are internally grounded.

When the terminals 43, 45 of the IC memory card are connected to the terminals 73, 75 of the connector 7, the inputs to the OR gate are Low, and therefore the output of the OR gate is Low. If at least one of the terminals 73 and 75 is not connected with the terminals 43 and 45, the OR gate 51 outputs a High signal (=Vcc). Thus, by monitoring the output of the OR gate 51, it can be determined whether the IC memory card 4 is fully inserted into the loading unit 6. Further, the output signal is fed to the controller 20 which performs various operations depending on the output signal, i.e., the detection signal.

The photographing operation will now be described. First, the main switch is turned on, and then the IC memory card 4 is manually loaded into the loading unit 6. When the IC memory card 4 is fully inserted, terminals 43 and 45 are electrically connected with terminals 73 and 75 of the connector 7. When it is detected that the IC memory card is fully inserted (i.e., the output signal of OR gate 51 is low), power is supplied to the IC memory card 4 from the power source 22 (FIG. 1). The controller 20 controls the IC memory card controller 17 to retrieve IC memory card attribute information and camera control information which is stored in the IC memory card 4. The retrieved information is stored in the non-volatile memory 21. In accordance with the retrieved information from the IC memory card 4, the controller 20 sets the operation modes for each of the circuits 13 through 17. The information stored in the IC memory card 4 includes program information related to a calculation of exposure.

When a picture is to be taken, a release button is pressed, and an aperture value and shutter speed are determined according to the exposure program information obtained from the IC memory card 4. The image of an object to be photographed is formed on the CCD 12. The shutter speed may be adjusted with a mechanical shutter or by adjusting an integration time period of the CCD 12. The photographing circuit 13 drives the CCD 12 in accordance with a signal transmitted from the controller 20, and the CCD 12 outputs an analog image signal.

The analog image signal is inputted to the image signal processing circuit 14 through the photographing circuit 13. The image signal processing circuit 14 amplifies the analog image signal and changes the analog image signal into a digital image signal. A predetermined image processing operation may also be applied to the digital image signal.

The digital image signal outputted by the image signal processing circuit 14 is temporarily stored in a predetermined area of the image memory 15 synchronously with a writing clock. Then, the stored digital image signal is read out of the image memory 15 synchronously with a reading clock which is slower than the writing clock, and inputted in the image compression/expansion circuit 16. In the image compression/expansion circuit 16, the digital image signal is compressed to reduce the data size to a predetermined size. The digital image signal data is then transmitted to the IC memory card controller 17.

The digital image signal is then transmitted through the connector 7 and the terminals of the IC memory card 4 to a predetermined area of the IC memory card 4. Therefore, digital image signal data corresponding to a picture of a photographed object is stored on the IC memory card 4.

Images stored in the IC memory card 4 can be retrieved and reproduced and displayed on an external displaying device. The image reproduction process will now be described.

When an image is reproduced, the digital image signal data read out of the IC memory card 4 is transmitted to the image compression/expansion circuit 16 through the terminals of the IC card 4, connector 7, and the IC memory card controller 17. In the image compression/expansion circuit 16, the image data is expanded to its original size by applying an expanding operation or a predetermined interpolation operation.

The expanded image signal is temporarily stored in the image memory 15 under the control of the image signal processing circuit 14. Then, the image signal stored in the image memory 15, is read out and transmitted to the external displaying device as a video signal, by the image signal processing circuit 14.

Figure 6:
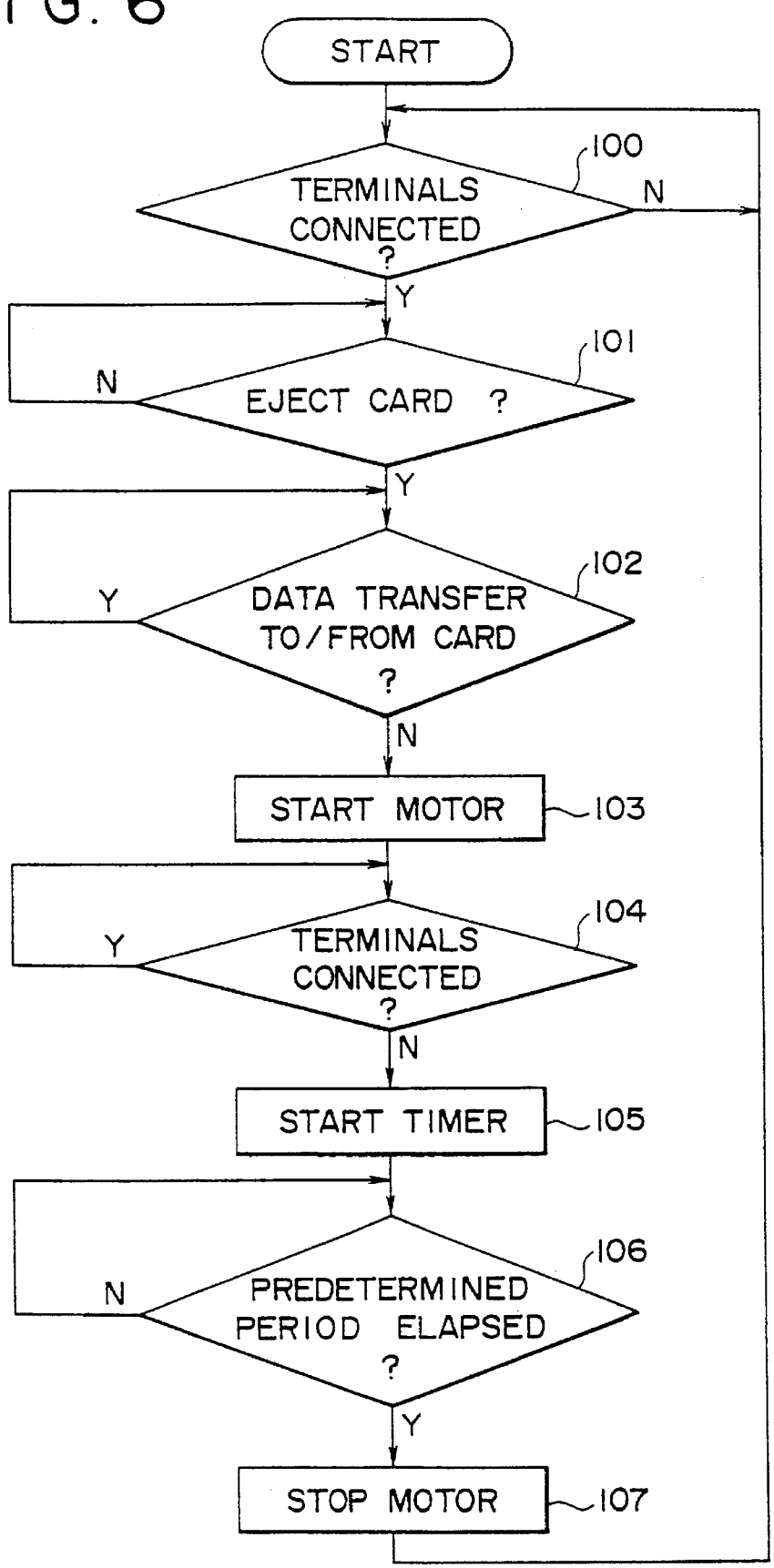
FIG. 6 is a flowchart illustrating the ejection of the IC memory card.

After all the photographs have been taken, the IC memory card 4 is ejected from the camera 1. The ejection process is shown in the flowchart of FIG. 6, and is described below.

In step 100, the controller 20 detects whether the IC card 4 is connected to the connector 7, based on the detection signal transmitted from the detecting unit 5. If the ejection switch of the operation panel 18 is operated (step 101:Y), it is detected whether data is being exchanged between the data communicating device 2 (the IC memory card controller 17) and the IC memory card 4 (step 102). If data is being transferred, the detection (i.e., step 101) is repeated until the data exchange is completed. When it is detected that the no more data is being transferred (step 102:N), the motor 35 is driven to move the carrier 31 so as to eject the IC memory card 4 out of the loading unit 6. The detecting operation is described below in more detail. When the write-enable-signal or read-enable-signal is output to the IC memory card, or when an address counter (not shown) in the IC memory controller 17 starts operating, the IC memory controller 17 is arranged to set a flag. The controller 20 monitors the condition of the flag to determine whether data is being transferred.

After the motor 35 has been started, the controller 20 monitors the connection of the terminals 43, 45 and 73, 75 based on the detection signal transmitted from the detecting unit 5. When the terminals 43, 45 are disconnected from the terminals 73 and 75, a timer is started (step 105); the timer measures a predetermined period required to move the carrier 31, such that the IC memory card 4 is ejected. After the elapse of the predetermined period, the motor 35 is stopped (steps 106, 107).

As described above, according to the present invention, the IC memory card 4 is not ejected while data is being exchanged between the IC memory card 4 and the camera 1. Thus, if data is being transmitted from the IC memory card 4 to the camera 1, the camera 1 will receive all the data, ensuring proper control of the camera 1. If data is being transmitted from the camera 1 to the IC memory card 4, all of the data will be stored in the desired area of the IC memory card 4, resulting in the entire photograph being stored.

Due to the engagement force or friction between the terminals 43, 45, and terminals 73, 75, more time may be required to disengage the IC memory card 4 from the connector 7. Therefore, the time that the motor 35 is driven may be different depending on this frictional force. However, according to the present invention, the period of movement of the carrier 31 is measured after the disconnection of the terminals. Therefore, regardless of the engagement force, the carrier 31 is always accurately moved to fully eject the IC memory 4.

Further, since the start of the ejection process is based upon the disconnection of the terminals, extra sensors such as an optical sensor are unnecessary, thereby simplifying the manufacturing of the camera 1.

Figure 7:
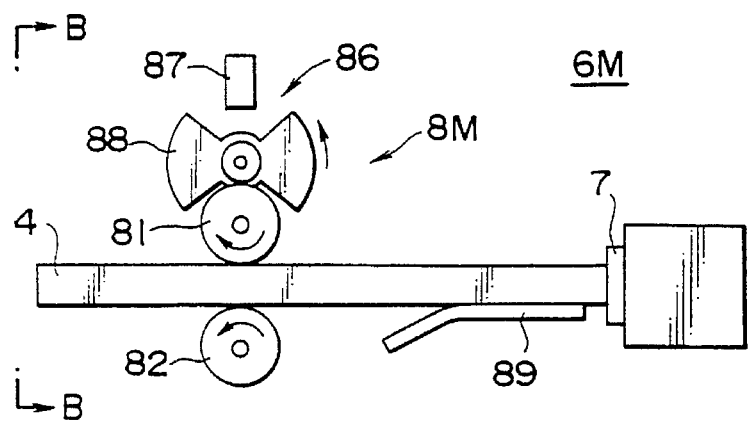
FIG. 7 shows a side view of a loading unit of the still video camera according to a second embodiment of the present invention, when an IC memory card is completely inserted into the still video camera.
Figure 8:
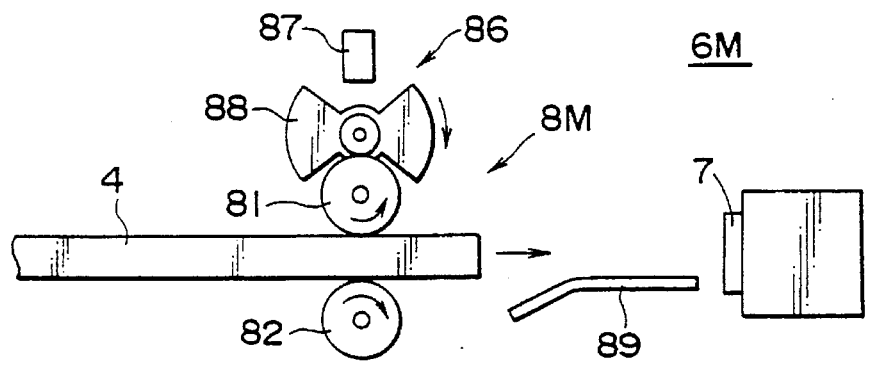
FIG. 8 shows a side view of the loading unit shown in FIG. 7, when an IC memory card is partially ejected from the still video camera.
Figure 9:
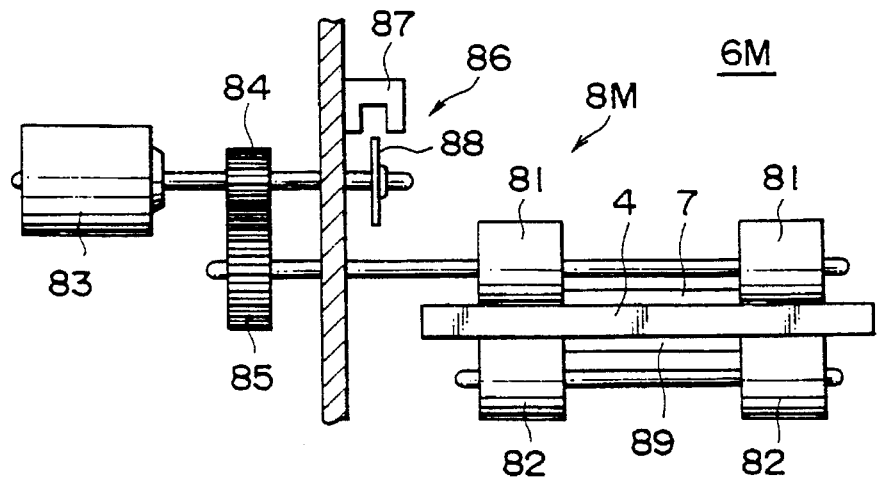
FIG. 9 shows a sectional view along line B—B of the loading unit shown in FIG. 7.

FIGS. 7 and 8 show a schematic side view of a second embodiment of the present invention, while FIG. 9 shows a section along line B—B of FIG. 7.

In this second embodiment, a loading unit 6M is used. This is similar to loading unit 6 of the first embodiment described above. Similar parts have common reference numerals, and will not be described.

FIG. 7 shows the IC memory card 4 fully inserted in the loading unit 6M, while FIG. 8 shows the IC memory card 4 being inserted in the unit 6M.

The loading unit 6M includes a conveying unit 8M which comprises a pair of rollers 81 and 82, a motor 83 for driving the roller 81, a gear 84 which is secured to the shaft of the motor 83, a gear 85 which is secured to the shaft of the roller 81 and which engages with the gear 84, an encoder 86 for detecting the rotation of the shaft of the motor 83, and a guide member 89 for guiding the loaded IC memory card 4 so that the terminals 43, 45 are properly directed to the terminals 73, 75.

The roller 82 is a freely rotatable idle roller. The rollers 81 and 82 are made of resilient material such as rubber or the like, and arranged to hold the IC memory card 4 with a predetermined pressure.

The encoder 86 includes a photointerrupter 87 which has a light emitting element and a light receiving element, and a fan-shaped rotary plate 88 secured to the shaft of the motor 83. As the shaft of the motor 83 rotates, the rotary plate 88 periodically interrupts the light path, resulting in the photointerrupter generating a pulse signal. By counting the number of pulses, the amount of rotation of the plate 88, and therefore the conveyed amount of the IC memory card 4, is known.

Figure 10:
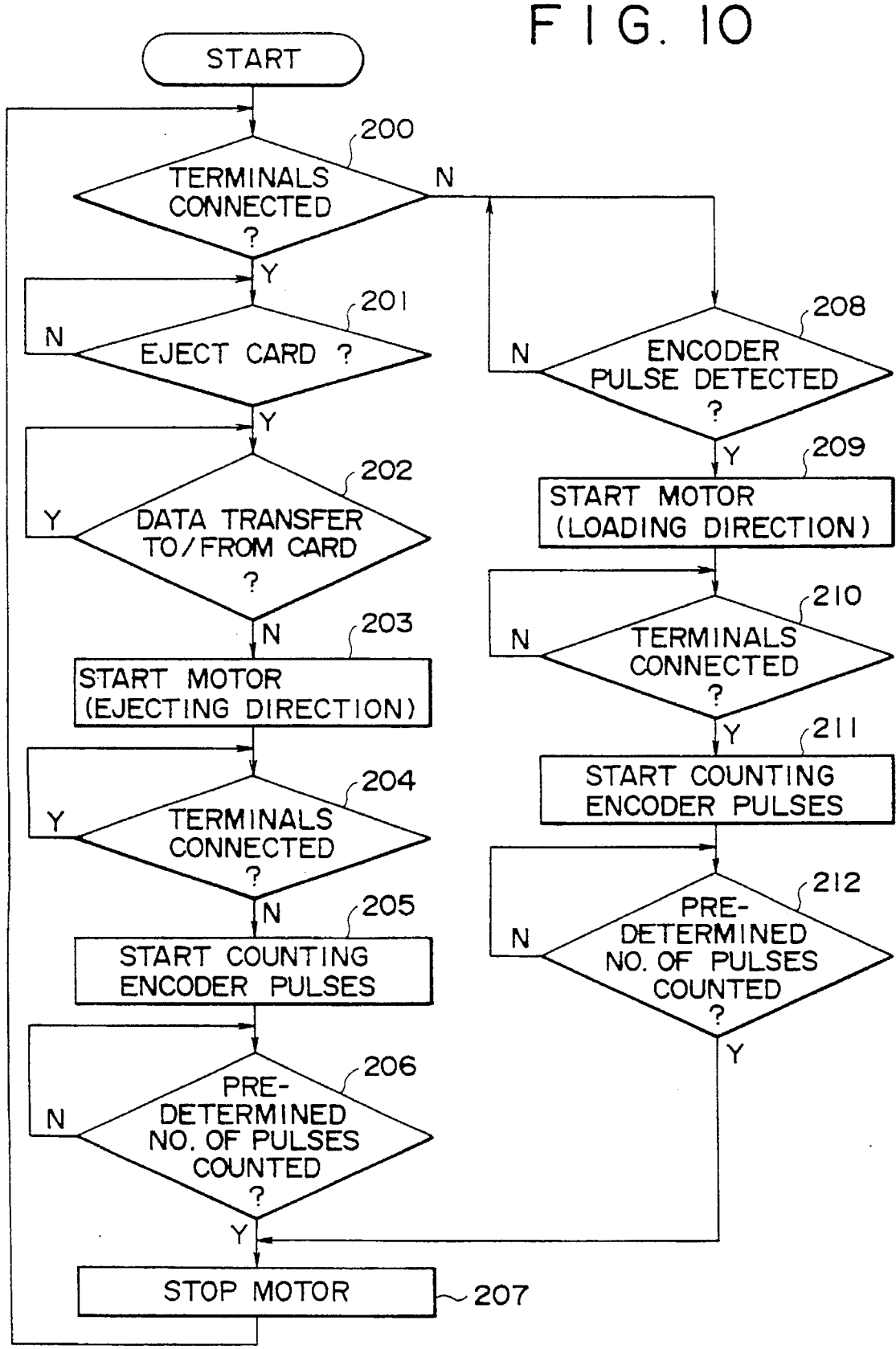
FIG. 10 is a flowchart illustrating the loading and ejection of the IC memory card according to the second embodiment of the present invention.

FIG. 10 shows a flowchart of the loading and ejecting operations according to the second embodiment of the present invention.

In step 200, the controller 20 detects whether the IC memory card 4 is connected to the connector 7, based on the detection signal transmitted from the detecting unit 5. If the ejection switch of the operation panel 18 is operated (step 201:Y), it is detected whether data is being exchanged between the data communicating device 2 (the IC memory card controller 17) and the IC memory card 4 (step 202). If data is being transferred (step 202:Y), the detection is repeated until the data exchange is completed. When it is detected that no more data is being transferred (step 202:N), the motor 83 is driven, in step 203, to rotate gear 84, such that gear 85 and roller 81 rotate in a clockwise direction, as indicated in FIG. 7.

In step 204, the controller 20 again detects whether the IC memory card 4 is still connected to the connector 7, based on the detection signal transmitted from the detecting unit 5. When the frictional force between the terminals 43, 45 and 73, 75 has been overcome, the terminals will be disconnected (step 204:N), and the rollers 81, 81 will move the IC memory card 4 out of the loading unit 6M (i.e., to the left in FIG. 7). Further, the rotary plate 88 of the encoder 86, also starts to rotate. The rotation of rotary plate 88 interrupts light in the photointerruptor 87, resulting in a pulsed output from encoder 86. The controller 20 starts counting the pulses from the encoder 86 in step 205.

The controller 20 continues driving the motor 83 until a predetermined number of pulses has been counted (step 206:Y). Then, the motor is stopped in step 207.

At step 200, if the terminals are not connected (step 200:N), then, control goes to step 208, where the controller waits until an encoder pulse is detected. An encoder pulse will be detected when the IC memory card 4 is manually inserted into the loading unit 6M, such that it rotates the rollers 81. Once the encoder pulse is detected, the controller 20 drives the motor 83 in the loading direction, (step 209) to move the IC card 4 towards the connectors 7 (i.e., to the right as shown in FIG. 8).

The controller 20 drives the motor until the terminals 43, and 45 of the IC memory card 4 are connected with the terminals 73, and 75 of the connector 7, in step 210. However, this is not a strong connection, and therefore, the IC memory card 4 must be moved further in the loading direction. In step 211, the controller 20 starts counting encoder pulses, and controls the motor 83 to continue driving the rollers 81, until a predetermined number of pulses has been counted (step 212:Y). This ensures a good connection between the IC memory card 4 and the connector 7. Then, the controller 20 stops the motor in step 207.

As described above, when the IC memory card 4 is first inserted into the loading unit 6M, an encoder pulse is generated, and the loading of the IC memory card 4 is controlled by the controller 20. When the card is to be ejected, the controller 20 determines whether there is data communication between the IC memory card 4 and the IC memory card controller 17. If there is no communication, the controller 20 controls the motor 83 to rotate rollers 82, thereby moving the IC memory card 4 out of the loading unit 6M. Therefore, there is no accidental interruption of the data communication between the IC memory card 4 and the camera 1, thereby ensuring that all of the picture information is stored on the IC memory card 4. Further, if the IC memory card 4 was providing data related to exposure control or compensation to the camera 1, there would be no interruption in this data communication, and the camera 1 would receive all the proper control information.

In the above described embodiments, the motor directly drives a gear. However, it is possible to include a slip clutch mechanism between the motor and gear, in order to prevent excessive loading of the motor.

A still video camera has been illustrated embodying the present invention, however, any device which uses removable IC memory cards may employ the present invention.

The present disclosure relates to subject matter contained in Japanese Patent Application No. HEI 5-228143 filed on Aug. 20, 1993, which is expressly incorporated herein by reference in its entirety.

What is claimed is:

1. A data communication device which exchanges data with an IC memory card loaded therein, said device comprising:

a mechanism for ejecting said IC memory card out of said data communicating device, said mechanism comprising:

a holding member for holding said IC memory card;

a driver for driving said holding member when said IC memory card is to be ejected out of said data communicating device; and an encoder, said encoder outputting a pulse when a rotary member of said encoder is rotated by a predetermined angle;

a detector for detecting whether data is being exchanged between said IC memory card and said data communicating device; and a controller for inhibiting said mechanism from ejecting said IC memory card if said detector detects that data is being exchanged and for controlling said driver to drive said holding member until said encoder has output a predetermined number of pulses.

2. The data communicating device according to claim 1, further comprising a connecting device, wherein when said IC memory card is connected to said connecting device, said connecting device outputs a predetermined signal.

3. The data communicating device according to claim 2, wherein when said IC memory card is to be ejected, said controller controls said driver to drive said holding member in a direction for ejecting said IC memory card until said connecting device outputs another predetermined signal so that said IC memory card will be disconnected from said connecting device.

4. The data communicating device according to claim 3, further comprising a timing device, wherein after said connecting device outputs said another predetermined signal, said controller controls said driver to drive said holding member until said timing device determines that a predetermined time has elapsed.

5. The data communicating device according to claim 2, wherein when said IC memory card is inserted into said ejecting mechanism, and onto to said holding member, said controller controls said device to drive said holding member such that said IC memory card is completely inserted into said ejecting mechanism.

6. The data communicating device according to claim 5, further comprising a connecting device, said controller controlling said driver to drive said holding member until said detector outputs a predetermined a signal so that said IC memory card will be connected to said connecting device.

7. The data communicating device according to claim 6, said controller enabling said ejecting mechanism to eject said IC memory card when said detector detects that said data exchange has finished.

8. A data communication device which exchanges data with an IC memory card loaded therein, said device comprising:

a mechanism for ejecting said IC memory card out of said data communication device;

a detector for detecting whether data is being exchanged between said IC memory card and said data communication device;

a controller for inhibiting said mechanism from ejecting said IC memory card if said detector detects that data is being exchanged and for controlling said mechanism to eject said IC memory card after said detector detects data is no longer being exchanged between said IC memory card and said data communication device;

a holding member for holding said IC memory card;

a driver for driving said holding member when said IC memory card is to be ejected out of said data communicating device, said mechanism further comprising an encoder, said encoder outputting a pulse when a rotary member of said encoder is rotated by a predetermined angle, said controller controlling said driver to drive said holding member until said encoder has output a predetermined number of pulses.

9. The data communication device according to claim 8, further comprising a connecting device, wherein when said IC memory card is connected to said connecting device, said connecting device outputs a first predetermined signal.

10. The data communication device according to claim 9, wherein when said IC memory card is to be ejected, said controller controls said driver to drive said holding member in a direction for ejecting said IC memory card until said connecting device outputs a second predetermined signal indicative that said IC memory card is disconnected from said connecting device.

11. The data communication device according to claim 10, further comprising a timing device, wherein after said connecting device outputs said second predetermined signal, said controller controls said driver to drive said holding member until said timing device determines that a predetermined time has elapsed.

12. The data communication device according to claim 8, wherein when said IC memory card is inserted into said ejecting mechanism, and onto to said holding member, said controller controls said driver to drive said holding member such that said IC memory card is completely inserted into said ejecting mechanism.

* * * * *

UNITED STATES PATENT AND TRADEMARK OFFICE
CERTIFICATE OF CORRECTION

PATENT NO. : 5,563,396
DATED : October 8, 1996
INVENTOR(S) : Yoshio WAKUI

It is certified that error appears in the above-indentified patent and that said Letters Patent is hereby corrected as shown below:

At column 8, line 3 (claim 5, line 1), change "2," to ---1,---.

At column 8, line 6 (claim 5, line 4), change "device" to ---driver---.

At column 8, line 60 (claim 12, line 3), delete "ejecting".

At column 8, line 63 (claim 12, line 6), delete "ejecting".

Signed and Sealed this

Fifteenth Day of April, 1997

*Attest:*

BRUCE LEHMAN

*Attesting Officer*  *Commissioner of Patents and Trademarks*